United States Patent
Dehn, Jr. et al.

[15] 3,661,500

[45] May 9, 1972

[54] COMPOSITION FOR DYEING HUMAN HAIR

[72] Inventors: Joseph W. Dehn, Jr., Great Neck, N.Y.; Mary R. Paradiso, Clifton, N.J.

[73] Assignee: Shulton, Inc., Clifton, N.J.

[22] Filed: July 27, 1970

[21] Appl. No.: 64,871

[52] U.S. Cl. ................................8/10, 8/17, 260/268 PC
[51] Int. Cl. .............................................D06p 3/04
[58] Field of Search ..............8/10; 260/268 PC, 378

[56] References Cited

FOREIGN PATENTS OR APPLICATIONS 6,709,520  1/1969  Netherlands.....................260/268 PC Primary Examiner—George F. Lesmes
Assistant Examiner—Patricia C. Ives
Attorney—Frank M. Nolan

[57] ABSTRACT

Composition for dyeing human hair in rich, colorful tones. The dyes consist of a surfactant with a hair coloring agent which may be 6-(2-aminoethylamino)-1,2,3,4-tetrahydronaphtho-[2,3-f]-quinoxaline-7,12-dione; 6-(2-methyl-aminoethylamino)-4-methyl-1,2,3,4-tetrahydronaphtho-[2,3-f]-quinoxaline-7,12-dione; and 6-(2-ethylaminoethylamino)-4-ethyl-1,2,3,4-tetrahydronaphtho-[2,3-f]-quinoxaline-7,12-dione or mixtures of such coloring agents.

8 Claims, No Drawings

COMPOSITION FOR DYEING HUMAN HAIR

This invention relates to compositions for dyeing keratinous fibers and particularly for dyeing human hair. The compositions of this invention comprise an active dye material selected from the class consisting of 6-(2-aminoethylamino)-1,2,3,4-tetrahy-dronaphtho-[2,3-f]-quinoxaline-7,12-dione; 6-(2-methylamino-ethylamino)-4-methyl-1,2,3,4-tetrahydronaphtho-[2,3-f]-quinoxaline-7,12-dione; and 6-(2-ethylaminoethylamino)-4-ethyl-1,2,3,4--tetrahydronaphtho-[2,3-f]-quinoxaline-7,12-dione and a surfactand. Desirably there are also added a thickening agent and a basic or acidic agent for regulating the pH of the composition. The surfactant is conveniently 0.1 to 10 percent, desirably 0.2 to 5 percent and preferably 0.5 to 2 percent of the weight of the composition, while conveniently, the thickening agent is 0.1 to 10 percent, desirably 0.2 to 5 percent and preferably 0.5 to 2 percent of the weight of the composition. While the pH of the composition may vary over a wide range, a range of 6 to 10 is desirable.

The active dye employed in the composition of this invention is a substituted anthraquinone having the formula:

(1) 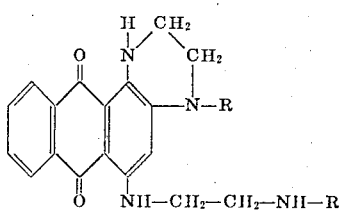

in which R is hydrogen, methyl or ethyl.

The substituted 1,2,3,4-tetrahydronaphtho-[2,3-f]-quinoxaline-7,12-diones employed as the active dyes may be produced by reacting, leucoquinizarin with a diamine having the formula:

$$H_2N—CH_2—CH_2—NH—R \qquad (2)$$

The reactants are heated at 100° C under an atmosphere of nitrogen. Subsequently, air is permitted to oxidize the leuco moiety of the product. The reaction which takes place is indicated by the following:

(3) 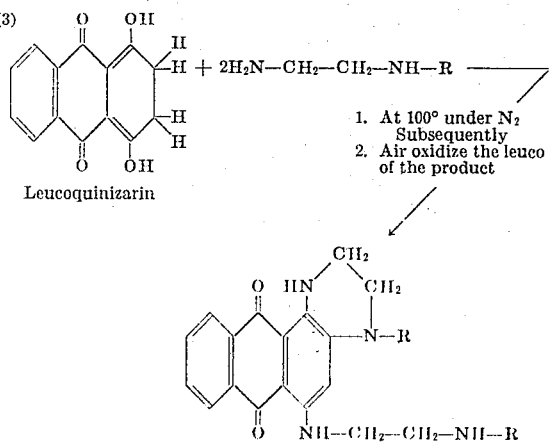

The surfactant may be anionic, nonionic, and cationic types. Examples of surfactants are:
sodium dodecylbenzene sulfonate, sodium tridecylbenzene sulfonate, sodium lauryl sulfate, sodium myristyl sulfate, dioctyl sodium sulfosuccinate, sodium lauryl ether sulfate, sodium N-lauroyl sarcosinate, sodium lauryl sulfoacetate, sodium sulforicinoleate, sodium N-methyl-N-palmitoyl taurate, sodium N-methyl-N-oleoyl taurate, sodium sulfoethyl ester of oleic acid, sodium lignosulfonate, isooctylphenyl polyethoxyethanol, nonylphenyl polyethoxyethanol, polyoxyethylene oleyl ether, polyoxyethylene dodecyl ether, coconut fatty acid diethanolamide, polyoxyethylene lauryl ester, lauric diethanolamide, linoleic alkanolamide, polyoxyethylene mono stearate ester, polyoxyethylene sorbitan monolaurate, polyoxyethylene sorbitan monopalmitate, polyoxyethylene sorbitan monostearate, polyoxyethylene sorbitan monooleate, cetyl pyridinium bromide, cetyl pyridinium chloride, stearyl dimethyl benzyl ammonium chloride, and dodecyl benzyl dimethyl ammonium chloride.

Examples of thickening agents are hydroxyethylcellulose, methylcellulose, carboxymethylcellulose, sodium carboxymethylcellulose, sodium alginate, gum arabic, and polyacrylic acid sodium salt.

The compositions are conveniently dissolved in a solvent such as water, ethyl alcohol, isopropyl alcohol, propylene glycol and triethylene glycol.

Dyes employed in conjunction with the active dyes of the compositions of this invention are any other dyes normally used in the dyeing of human hair, including nitro, azo, or quinone types. Examples of dyes which may be used are: 2-nitro-p-phenylenediamine, 4-nitro-m-phenylenediamine, 4-nitro-o-phenylenediamine and various mono, di and tri-N-substituted derivatives of these three dyes.

Other examples include: 5-nitro-2,4-diaminotoluene, 4-nitro-2-aminophenol, isopicramic acid, N-methyl isopicramic acid, 2-hydroxy-1,4-naphthoquinone, 5-hydroxy-1,4-naphthoquinone, 2,4-dinitro-4'-hydroxy-diphenylamine, 2,4-dinitro-4'-amino-diphenylamine, and 3-(m-nitrophenylazo)-2,4-dihydroxy-1-methyl quinoline.

A more comprehensive understanding of this invention is obtained by reference to the following examples.

EXAMPLE 1

A mixture was prepared with the following ingredients:

| Ingredients | Parts by Weight |
| --- | --- |
| 6-(2-aminoethylamino)-1,2,3,4-tetrahydro-naphtho-[2,3-f]-quinoxaline-7,12-dione (Hereinafter called "Active Dye A") | 1.00 |
| 2-nitro-p-phenylenediamine | 0.03 |
| 4-nitro-m-phenylenediamine | 0.05 |
| propylene glycol | 5.00 |
| sodium laurylsulfate | 1.00 |
| hydroxyethylcellulose | 5.00 |
| water | 87.92 |
| | 100.00 |

The mixture had a pH of 9.5. The color on white hair was light golden brown.

The active dye which is 6-(2-aminoethylamino)-1,2,3,4-tetrahydronaphtho-[2,3-f]-quinoxaline-7,12-dione may be prepared by either of the following procedures:

PROCEDURE I 19.2 G (0.08 mole) of leucoquinizarin was added to 100 ml of ethylenediamine under a nitrogen atmosphere at below 40° C. The reaction was then heated and stirred at 100° C for 50 minutes. It was subsequently oxidized by bubbling in air for 30 minutes. After cooling and standing overnight the resulting precipitate was filtered, washed first with diethyl ether and then with hot methyl alcohol and dried to give 10.8 g (0.0335 mole) of solid product equal to 41.9 percent of theory. This material was recrystallized from n-butyl alcohol to produce 7.4 g (0.023 mole) of crystals with m.p. 207°–208° C equivalent to 27.8 percent of the theoretical quantity of 6-(2-aminoethylamino)-1,2,3,4-tetrahydronaphtho-[2,3-f]-quinoxaline-7,12-dione.

PROCEDURE II 19.2 G (0.08 mole) of leucoquinizarin was mixed with 100 ml of ethylenediamine and a thick purple mass formed. The reaction was heated at 100° C for 1 hour. Subsequently air was bubbled through to oxidize the leuco. After standing overnight at room temperature, the crystalline product which had separated was filtered, washed with a small amount of ether and hot methyl alcohol and dried. The product was then recrystallized from n-butyl alcohol to give 3.6 g (0.0111 mole) of black crystals with a copper reflex with m.p. 207°–208° C equal to 13.9 percent of theoretical yield of 6-(2-aminoethylamino)-1,2,3,4-tetrahydronaphtho-[2,3-f]-quinoxaline-7,12-dione. A second crop of 3.5 g was isolated and then recrystallized from n-butyl alcohol to give another 2.8 g (0.00864 mole) of crystals with m.p. 207°–208° C equal to a 10.8 percent yield. The total yield of product was 6.4 g (0.01975 mole) or 24.7 percent of theory yield after recrystallization.

The 2,3-dihydro-1,4-dihydroxyanthraquinone (leucoquinizarin) used in Procedures I and II was prepared as follows:

120 G (0.500 mole) of recrystallized 1,4-dihydroxyanthraquinone (quinizarin) was ground in a mortar and pestle with a small amount of water and transferred to a 5,000 ml 3-neck flask. Then water was added to a total amount of 2,500 ml of water. After adding 120 g (1.130 mole) of sodium carbonate, the mixture was heated to 75° C under nitrogen. Then 240 g (1.38 mole) of sodium hydrosulfite was added gradually within 1 hour while stirring at 75° to 80° C under an atmosphere of nitrogen. The resulting yellow suspension was stirred for 3 hours at 75° to 80° C under a nitrogen atmosphere. This yellow suspension was filtered while hot (78° C) and then washed with a solution containing 2.0 g of sodium hydrosulfite in 4000 ml of water until neutral to litmus. The product (wet weight 203 g) was dried at room temperature under a high vacuum (0.05 mm of Hg). The vacuum dried product gave 108.0 g (0.446 mole) of yellow solid with m. p. 152°–154° C equivalent to 89.2 percent of the theoretical quantity of 2,3-dihydro-1,4-dihydroxyanthraquinone. Recrystallization of 1.00 g from 100 ml of absolute ethyl alcohol produced 0.60 g of yellow needles with m. p. 154°–155° C while a second recrystallization gave 0.40 g of yellow needles with m. p. 154°–155° C.

ANALYSIS: Calculated for
$C_{14}H_{10}O_4$: C=69.42% H=4.16%
Found: C=69.18% H=4.29%

The starting material, 1,4-dihydroxyanthraquinone (quinizarin), was purified by recrystallizing 200 g of commercial material from 4000 ml of acetic acid to give 144 g of orange crystals with m.p. 196°–197.5° C of purified 1,4-dihydroxyanthraquinone.

EXAMPLE 2

The procedure of Example 1 was followed except that hydrochloric acid was added to obtain a pH of 8.0. When applied to human white hair, the composition produced medium golden brown color.

EXAMPLE 3

The procedure of Example 1 was followed except that sufficient hydrochloric acid was added to produce a pH of 6.5. When applied to human white hair, a dark brown color was obtained.

EXAMPLE 4

The procedure of Example 1 was followed except that hydrochloric acid was added to produce a pH of 4.0. When the composition was applied to human white hair, a light golden brown was obtained.

EXAMPLE 5

A mixture was prepared with the following ingredients:

| Ingredients | Parts by Weight |
| --- | --- |
| Active Dye A | 1.00 |
| 2-nitro-p-phenylenediamine | 0.05 |
| 4-nitro-m-phenylenediamine | 0.05 |
| Hydroxyethylcellulose | 5.00 |
| Isooctylphenylpolyethoxyethanol | 2.00 |
| Propylene glycol | 5.00 |
| Water | 86.90 |
| | 100.00 |

The mixture had a pH of 9.5. When applied to human white hair the color was dark bluish charcoal grey.

EXAMPLE 6

The procedure of Example 5 was followed except that hydrochloric acid was added to obtain a pH of 8. When applied to human white hair a dark bluish charcoal grey color was obtained.

EXAMPLE 7

The procedure in Example 5 was followed except that hydrochloric acid was added to obtain a pH of 6.5. When applied to human white hair, a dark bluish charcoal grey was obtained.

EXAMPLE 8

The procedure of Example 5 was followed except that hydrochloric acid was added to obtain a pH of 4.0. When applied to human white hair, a medium golden brown was obtained.

EXAMPLE 9

A mixture was prepared with the following ingredients:

| Ingredients | Parts by Weight |
| --- | --- |
| Active Dye A | 1.00 |
| 2-nitro-p-phenylenediamine | 0.07 |
| 4-nitro-m-phenylenediamine | 0.07 |
| Hydroxyethylcellulose, 4000 cps. | 1.00 |
| Sodium benzoate | 0.10 |
| Citric Acid | q.s. pH 6.5 |
| Isooctylphenylpolyethoxyethanol | 2.00 |
| Isopropyl Alcohol | 10.00 |
| Water | q.s. 100% |

When applied to human white hair, a dark greyish brown was obtained.

EXAMPLE 10

A mixture was prepared with the following ingredients:

| Ingredients | Parts by Weight |
| --- | --- |
| Active Dye A | 1.00 |
| 2-nitro-p-phenylenediamine | 0.07 |
| 4-nitro-m-phenylenediamine | 0.07 |
| Hydroxyethylcellulose, 4000 cps. | 1.00 |
| Sodium benzoate | 0.10 |
| Citric acid | q.s. pH 6.5 |
| Polyoxyethylene (10) oleyl ether | 5.00 |
| Isopropyl alcohol | 10.00 |
| Water | q.s. 100% |

When applied to human white hair, a medium brown was obtained.

EXAMPLE 11

A mixture was prepared with the following ingredients:

| Ingredients | Parts by Weight |
| --- | --- |
| Active Dye A | 1.00 |
| 2-nitro-p-phenylenediamine | 0.07 |
| 4-nitro-m-phenylenediamine | 0.07 |
| Hydroxyethylcellulose, 4000 cps. | 1.00 |
| Lactic acid | q.s. pH 6.5 |
| Coconut Diethanolamide | 2.00 |
| Isopropyl alcohol | 10.00 |
| Sodium benzoate | 0.01 |
| Water | q.s. 100% |

When applied to human white hair, a dark grey was obtained.

EXAMPLE 12

A mixture was prepared with the following ingredients:

| Ingredients | Parts by Weight |
| --- | --- |
| Active Dye A | 1.00 |
| 2-nitro-p-phenylenediamine | 0.01 |

| | |
|---|---|
| 4-nitro-m-phenylenediamine | 0.07 |
| Hydroxyethylcellulose, 4000 cps. | 0.50 |
| Lactic acid | q.s. pH 6.5 |
| Polyoxyethylene ether of oleyl alcohol (20) | 2.00 |
| Sodium benzoate | 0.01 |
| Isopropyl alcohol | 10.00 |
| Water | q.s. 100% |

When applied to human white hair, a dark ash brown was obtained.

EXAMPLE 13

The procedure of Example 12 was followed except that lactic acid was added to obtain a pH of 4.5.

When applied to human white hair, a medium golden brown was obtained.

EXAMPLES 14 THROUGH 39

Mixtures of ingredients of compositions were prepared containing Active Dye A, a surfactant, a thickening agent and an acid or basic agent, if required. For each composition, the quantity of Active Dye A, the identity and percent by weight of the surfactant and thickening agent, the acid or basic agent or other additive, the pH of the composition and color produced on human natural white hair are given in the following table:

Sufficient hydrochloric acid was added to obtain a pH of 7.0.

When applied to white human hair, a purplish blue color was obtained.

The active Dye B which is 6-(2-methylaminoethylamino)-4-methyl-1,2,3,4-tetrahydronaphtho-[2,3-f]-quinoxaline-7,12-dione may be prepared by the following method:

9.68 G (0.040 mole) of 2,3-dihydro-1,4-dihydroxyanthraquinone (leucoquinizarin) was added gradually to 59.3 g (0.800 mole) of N-methylethylenediamine while stirring under nitrogen. There was an exothermic reaction which raised the temperature spontaneously from 25° to 40° C. A transient blue color developed and then a dark yellow-brown color formed in the resulting thick suspension. The mixture was stirred for 10 minutes at 35° to 40° C without heating to insure that the exotherm had dissipated. The reaction was heated in 20 minutes to 50° C. The deep yellow-brown reaction mixture was stirred under nitrogen for 3 hours at 50° to 52° C to effect the condensation reaction of leucoquinizarin with 2 moles of the N-methylethylenediamine. It was then heated in 45 minutes to 100° C. The reaction became a dark brown solution with a slight green-blue cast. It was stirred under nitrogen for another 3 hours at 100° to 104° C in order

| Example | Quantity in gms. of active dye A | Acid or basic agent | Surfactant by percent | Thickening agent by percent | pH | Color on natural white hair |
|---|---|---|---|---|---|---|
| 14 | 0.2 | Nitrilotriacetic acid | 1.0 polysorbate 60 | 1.0 carboxymethyl cellulose | 4.5 | Medium blue. |
| 15 | 0.2 | Boric acid | 1.0 polyoxyethylene sorbitan monolaurate. | 1.0 hydroxyethyl cellulose | 8.0 | Dark blue. |
| 16 | 0.2 | Potassium nitrate | 1.0 sodium laurylether sulfate | 1.0 sodium carboxymethyl cellulose. | 9.0 | Pale blue. |
| 17 | 0.2 | Tartaric acid | 1.0 linoleic alkanolamide | 1.0 carboxymethyl cellulose | 4.0 | Light blue. |
| 18 | 0.2 | Sodium bicarbonate | 1.0 coconut alkanolamide | 1.0 hydroxyethyl cellulose | (¹) | Medium blue. |
| 19 | 0.2 | Ammonium chloride | 1.0 isooctylphenyl polyethoxyethanol. | do | 8.0 | Do. |
| 20 | 0.2 | Lactic acid | 1.0 polyoxyethylene (10) oleyl ether. | 1.0 methyl cellulose | 4.0 | Light blue. |
| 21 | 0.2 | 1.0 oleic acid and phosphoric acid | 1.0 coconut diethanolamide | do | 4.0 | Dark blue. |
| 22 | 0.2 | Diethanolamine | 1.0 N-coco B-amino propionic acid. | 1.0 carboxymethyl cellulose | 8.8 | Light blue. |
| 23 | 0.2 | Monoethanolamine | 1.0 N-lauryl myristyl B-amino propionic acid. | 1.0 sodium carboxymethyl cellulose. | 9.2 | Pale blue. |
| 24 | 0.2 | Monoisopropanol amine | 1.0 ½ salt of sodium N-lauryl β-iminodi propionic acid. | do | 9.0 | Do. |
| 25 | 0.2 | Methyl morpholine | 1.0 N-coco B-amino propionic | 1.0 carboxymethyl cellulose | 7.8 | Light blue. |
| 26 | 0.2 | N-ethyl morpholine | 1.0 N-lauryl myristyl B-amino propionic acid. | do | 7.5 | Do. |
| 27 | 0.2 | Acetic acid | 1.0 ½ sodium salt N-lauryl B-amino dipropionic acid. | 1.0 carboxymethyl cellulose | 4.5 | Do. |
| 28 | 0.2 | Acetic acid | 1.0 isoocytlphenyl polyethoxyethanol. | do | 4.5 | Do. |
| 29 | 0.2 | Hydrochloric acid | 1.0 N-lauryl β-iminodi propionic acid. | do | 4.5 | Do. |
| 30 | 0.2 | Acetic acid | 1.0 isoocytlphenyl polyethoxyethanol. | do | 4.5 | Do. |
| 31 | 0.2 | Hydrochloric acid | 1.0 N-lauryl β-iminodi propionic acid. | do | 4.8 | Do. |
| 32 | 0.18 | Nitrilotriacetic acid | 0.9 polysorbate 60 | do | 5.0 | Do. |
| 33 | 0.19 | Boric acid | 1.0 polyoxyethylene sorbitan monolaurate. | 1.0 hydroxyethyl cellulose | 8.0 | Medium blue. |
| 34 | 0.19 | Potassium nitrate | 1.0 sodium lauryl ether sulfate | 1.0 sodium carboxymethyl cellulose. | 9.0 | Pale blue. |
| 35 | 0.19 | Tartaric acid | 1.0 linoleic alkanolamide | 1.0 carboxymethyl cellulose | 4.0 | Light blue. |
| 36 | 0.19 | Phosphoric acid sodium bicarbonate. | 1.0 coconut alkanolamide | 1.0 hydroxyethyl cellulose | 7.3 | Do. |
| 37 | 0.19 | Ammonium chloride | 1.0 isoocytlphenyl-polyethoxyethanol. | do | 8.0 | Dark blue. |
| 38 | 0.2 | Lactic acid | 1.0 polyoxyethylene(10) oleyl ether. | 1.0 methyl cellulose | (²) | Medium blue.³ |
| 39 | 0.2 | Oleic acid | 1.0 coconut diethanolimide | do | (⁴) | Light blue.³ |

¹ Adj. to pH 7.5.
² Adj. to pH 7.0 NH₄OH.
³ Diluted 50/50 with 6% hydrogen peroxide.
⁴ Adj. to pH 9.5 NH₄OH.

EXAMPLE 40

A mixture was prepared with the following ingredients:

| | |
|---|---|
| 6-(2-methylaminoethylamino)-4-methyl-1,2,3,4-tetrahydronaphtho-[2,3-f]-quinoxaline-7,12-dione (hereinafter called "Active Dye B") | 0.5 |
| Sodium laurylsulfate | 1.0 |
| Water | 98.5 |
| | 100.0 | to cause the ring closure reaction and form the heterocyclic ring across the one and two positions of the anthraquinone derivative. The reaction mixture was subsequently oxidized by bubbling in air while heating and stirring for 1 hour to oxidize the leuco compound of the product. A strong blue color formed. After the air oxidation, it was allowed to cool slowly and stand overnight while the product precipitated.

The suspension was filtered to recover the product which had crystallized from the reaction mixture. The solid was washed with two 5 ml portions of N-methylethylenediamine. The bronzy crystals were washed with 100 ml of anhydrous diethyl ether which removed some red impurity. The solid was ground in a mortar and pestle with 25 ml of methyl alcohol. This suspension was filtered and the solid washed with 15 ml of methyl alcohol and dried. Some of the product dissolved in the methyl alcohol.

A yield of 2.60 g (0.00743 mole) of crystalline solid was obtained with m.p. 185°–191° C, mostly 189°–191° C, equal to 18.6% of theoretical yield of 6-(2-methylaminoethylamino)-4-methyl-1,2,3,4-tetrahydronaphtho-[2,3-f]-quinoxaline-7, 12-dione. Thin layer chromatography showed only one strong blue component. Recrystallization of this 2.60 g from a total of 100 ml of n-butyl alcohol gave 1.99 g (0.00568 mole) of blue crystals with metallic luster with m.p. 193°–194° C equivalent to 14.20 percent of theoretical yield. A second recrystallization of 0.34 g from 75 ml of n-butyl alcohol gave 0.28 g of crystals with m.p. 193°–194° C.
ANALYSIS: Calcd for
$C_{20}H_{22}N_4O_2$: C=68.55%; H=6.33%; N=15.99%
Found: C=68.54%; H=6.32%; N=15.94%

The starting material 2,3-dihydro-1,4-dihydroxy-anthraquinone (leucoquinizarin) was prepared as indicated under Example 1.

EXAMPLE 41

A mixture was prepared with the following ingredients:

| | |
|---|---|
| 6-(2-ethylaminoethylamino)-4-ethyl-1,2,3,4-tetrahydronaphtho-[2,3-f]-quinoxaline-7,12-dione (hereinafter called "Active Dye C") | 0.5 |
| Triton X-100 (isooctylphenyl polyethoxy ethanol) | 1.0 |
| Water | 98.5 |
| | 100.0 |

Sufficient hydrochloric acid was added to obtain a pH of 7.0.

When applied to white human hair, a medium blue color was obtained and when applied to damaged hair, a blue-black color resulted. (Damaged human hair is human hair which has been damaged by bleaching and by permanent waving.)

The blue compound 6-(2-ethylaminoethylamino)-4-ethyl-1,2,3,4-tetrahydronaphtho-[2,3-f]-quinoxaline-7,12-dione dyed human hair in strong blue shades.

It was prepared by the reaction of N-ethylethylenediamine with quinizarin (1,4-dihydroxyanthraquinone) as follows:

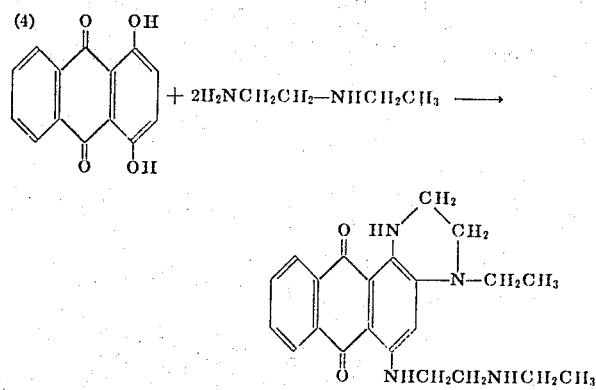

A solution containing 4.7 g (0.053 mole) of N-ethylethylenediamine in 18.5 ml of absolute alcohol was added from a dropping funnel into a stirred mixture of 3.7 g (0.015 mole) of quinizarin, 0.8 g (0.0075 mole) of sodium carbonate, 5.2 g (0.055 mole) of phenol and 12 ml of water. The reaction was heated to reflux and stirred overnight at reflux under an atmosphere of nitrogen. The reaction mixture was then poured into a saturated sodium chloride solution. The product, which precipitated, was then collected and dissolved in acetone. This acetone solution of the dye was poured into another saturated sodium chloride solution. The dye was extracted several times with ethyl acetate. The ethyl acetate solution of the dye was dried over anhydrous magnesium sulfate and filtered. The ethyl acetate solution was evaporated to dryness. The residue, after evaporating the ethyl acetate, was dissolved in dilute hydrochloric acid and extracted with methylene chloride to remove some impurities. The aqueous phase was made alkaline and extracted with methylene chloride to remove the dye from the aqueous phase. This methylene chloride solution of the dye was evaporated to dryness and the dye recrystallized from methyl cyclohexane. The magnesium sulfate used to dry the original ethyl acetate extracts had absorbed some of the blue dye. It was isolated from the magnesium sulfate by dissolving it in water and extracting and recrystallizing as described above. The combined product was recrystallized a second time from methyl cyclohexane to give 0.63 g, equivalent to 10.9 percent of the theoretical yield of 6-(2-ethylaminoethylamino)-4-ethyl-1,2,3,4-tetrahydronaphtho-[2,3,-f]-quinoxaline-7,12-dione as very dark blue crystals with m.p. 119°–120° C.

EXAMPLE 42

A mixture was prepared with the following ingredients:

| | | |
|---|---|---|
| Active Dye "C" | | 0.5 |
| BTC 2125 | [A mixture of equal quantities of n-alkyl dimethyl benzyl ammonium chlorides and n-alkyl dimethyl ethyl benzyl ammonium chlorides. Each of the ammonium chlorides comprise a mixture containing varying amounts of carbon atoms in the n-alkyl group. The mixture of n-alkyl dimethyl benzyl ammonium chlorides consists of 60% containing 14 carbon atoms in the n-alkyl group, 30% containing 16 carbon atoms, 5% containing 12 carbon atoms and 5% containing 18 carbon atoms. The mixture of n-alkyl dimethyl ethyl benzyl ammonium chlorides consists of 50% containing 12 carbon atoms in the n-alkyl group, 30% containing 14 carbon atoms, 17% containing 16 carbon atoms and 3% containing 18 carbon atoms.] | 0.5 |
| Water | | 99.0 |
| | | 100.0 |

Sufficient hydrochloric acid is added to obtain a pH of 7.0.
When applied to white human hair, a medium blue color was obtained and when applied to damaged human hair, a blue-black color resulted.

EXAMPLE 43

A mixture was prepared with the following ingredients:

| | |
|---|---|
| Active Dye "A" | 0.5 |
| Sodium lauryl sulfate | 1.0 |
| Water | 98.5 |
| | 100.0 |

When applied to white human hair, a dark blue color was obtained and when applied to damaged hair, a blue-black color resulted.

EXAMPLE 44

A mixture was prepared with the following ingredients:

| | |
|---|---|
| Active Dye "A" | 0.5 |
| Triton X-100 (isooctylphenylpolyethoxyethanol) | 1.0 |
| Water | 98.5 |
| | 100.0 |

When applied to white human hair, a dark blue color was obtained and when applied to damaged hair, a blue-black color resulted.

EXAMPLE 45

A mixture was prepared with the following ingredients:

| | |
|---|---|
| Active Dye "A" | 0.5 |
| BTC 2125 | 0.5 |
| Water | 99.0 |
| | 100.0 |

When applied to white human hair, a dark blue color was obtained and when applied to damaged hair, a blue-black color resulted.

EXAMPLE 46

A mixture was prepared with the following ingredients:

| | |
|---|---|
| Active Dye "B" | 0.5 |
| Triton X-100 | 1.0 |
| Water | 98.5 |
| | 100.0 |

When applied to white human hair, a dark blue color was obtained and when applied to damaged hair, a blue-black color resulted.

EXAMPLE 47

A mixture was prepared with the following ingredients:

| | |
|---|---|
| Active Dye "B" | 0.5 |
| BTC 2125 | 0.5 |
| Water | 99.0 |
| | 100.0 |

When applied to white human hair, a dark blue color was obtained, and when applied to damaged hair, a blue-black color resulted.

What is claimed is:

1. A composition for dyeing human hair comprising a hair coloring agent selected from the class consisting of 6-(2-aminoethylamino)-1,2,3,4-tetrahydronaphtho-[2,3-f]-quinoxaline-7,12-dione; 6-(2-methylaminoethylamino)-4-methyl-1,2,3,4-tetrahydronaphtho-[2,3-f]-quinoxaline-7,12-dione; and 6-(2-ethylaminoethylamino)-4-ethyl-1,2,3,4-tetrahydronaphtho-[2,3-f]-quinoxaline-7,12-dione and a surfactant.

2. A composition for dyeing human hair in accordance with claim 1 which also contains a thickening agent and an acidic or basic agent for controlling the pH of the composition.

3. A composition for dyeing human hair in accordance with claim 1 in which the surfactant is 0.1 to 10 percent and the thickening agent is 0.1 to 10 percent.

4. A composition for dyeing human hair in accordance with claim 1 in which the surfactant is 0.2 to 5 percent and the thickening agent is 0.2 to 5 percent.

5. A composition for dyeing human hair in accordance with claim 1 in which the surfactant is 0.5 to 2 percent and the thickening agent is 0.5 to 2 percent.

6. A composition for dyeing human hair in accordance with claim 1 in which said member is 6-(2-aminoethylamino)-1,2,3,4-tetrahydronaphtho-[2,3-f]-quinoxaline-7,12-dione.

7. A composition for dyeing human hair in accordance with claim 1 in which said member is 6-(2-methylaminoethyamino)-4-methyl-1,2,3,4-tetrahydronaphtho-[2,3-f]-quinoxaline-7,12-dione.

8. A composition for dyeing human hair in accordance with claim 1 in which said member is 6-(2-ethylaminoethylamino)-4-ethyl-1,2,3,4-tetrahydronaphtho-[2,3-f]-quinoxaline-7,12-dione.

* * * * *